(No Model.)

W. R. PATTERSON.
CABLE HANGER.

No. 312,755. Patented Feb. 24, 1885.

Witnesses.

Inventor.
William R. Patterson.
per. George R. Barton
Attorney.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

CABLE-HANGER.

SPECIFICATION forming part of Letters Patent No. 312,755, dated February 24, 1885.

Application filed June 9, 1884. (No model.)

*To all whom it may concern:*

Be it known that I, WILLIAM R. PATTERSON, a citizen of the United States, residing at Chicago, in the county of Cook and State of Illinois, have invented a certain new and useful Improvement in Cable-Hangers, (Case 38,) of which the following is a full, clear, concise, and exact description, reference being had to the accompanying drawings, forming a part of this specification.

My invention relates to suspending telegraph-cables; and it consists in a rigid hanger having a single round bearing-surface upon the suspending-wire, and a flat surface around the pipe, as herein described and claimed.

The hook is preferably of malleable iron galvanized, and is provided with a lug on the back to keep the nut of a bolt from turning, and a lug and projection on the front by which the zinc clamp is secured thereto. The clamps may be made all of the same size, and adapted to different-sized cables by using washers, preferably of iron, of different widths. The clamps may be painted and sanded to prevent slipping where they come against the pipe.

Figure 1:
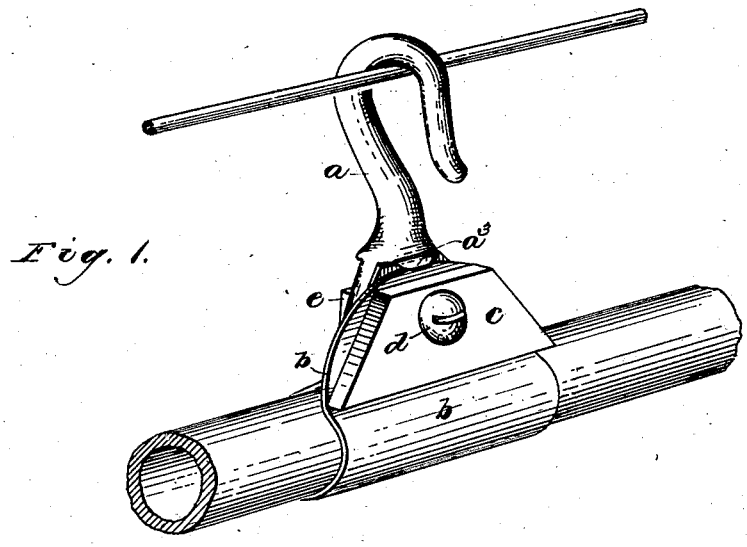
Figure 2:
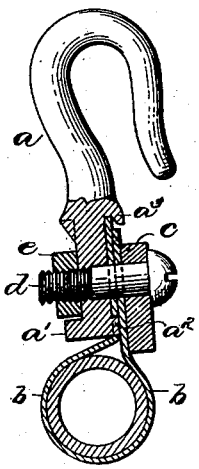
Figure 3:
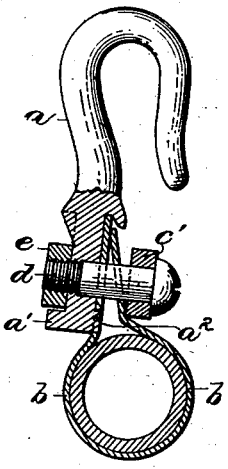
Figure 4:

My invention is illustrated in the accompanying drawings, in which Figure 1 is a perspective view showing my cable-hanger in use. Fig. 2 is a sectional view thereof. Fig. 3 is a similar view in which a narrow washer is used to adapt the zinc to larger pipe. Fig. 4 is a detailed view showing the paint and sand upon the under surface of the clamp.

Like parts are indicated by similar letters of reference in the different figures.

The hook $a$ is preferably provided with the lug $a'$ on the back, and the lug $a^2$ and projection $a^3$ on the front. The clamp $b$ is preferably of zinc. The under surface of the clamp is preferably painted and sanded, as indicated at $b'$, Fig. 4. The washers $c$ and $c'$ may be of such width as may be required to make clamps of the same size fit around the pipe of different-sized cables. The bolt $d$ passes through the washer, the clamp, and nut $e$, as shown, and may be turned into the nut with a screw-driver, the nut being prevented from turning by the lug $a'$. The zinc is riveted to the lug $a^2$, and the projection $a^3$ aids in holding the clamp in place.

In suspending cables, the hook and clamp of the hanger are first riveted together. The clamp is then placed around the cable-pipe and tightened by the bolt, as before described.

I claim—

1. In a cable-hanger, the combination, with the hook provided with the single rounded bearing for the suspending-wire, of the clamp $b$, attached rigidly to said hook, said clamp being clasped about the pipe of the cable and secured rigidly thereto by a bolt and a washer, said washer being of the width required to make the clamp fit the pipe.

2. In a cable-hanger, the combination, with the hook for suspending the hanger on the suspending-wire, of a clamp of zinc or similar sheet metal rigidly secured to said hook, said clamp passing about the pipe of the cable and clamped rigidly thereto, whereby the cable is supported, substantially as and for the purpose specified.

3. The combination, with the telegraph-cable and the suspending-wire, of a rigid hanger, said hanger consisting of the hook $a$, to which the clamp $b$ is riveted, and the bolt $d$, washer $c$, and nut $e$, substantially as shown and described.

4. In a cable-hanger, the combination, with the clamp which passes around the cable, of a bolt passing through the ends of the clamp, and a washer under the head of the said bolt outside the clamp whereby the clamp may be fitted and secured rigidly to the cable.

5. The combination, in a cable-hanger, of the hook and clamp attached thereto, and sanded on the inner surface, with the bolt, washer, and nut, whereby the clamp may be rigidly secured about the pipe, substantially as and for the purpose specified.

In witness whereof I hereunto subscribe my name this 5th day of June, A. D. 1884.

WILLIAM R. PATTERSON.

Witnesses:
GEORGE P. BARTON,
JOSEPH JENNINGS.